United States Patent [19]

Ryder et al.

[11] 3,852,308

[45] Dec. 3, 1974

[54] PROCESS FOR THE PRODUCTION OF PHTHALIC ANHYDRIDE

[75] Inventors: Robert C. Ryder, Bethel Park; Robert E. Ryan; William J. Klapproth, Jr., both of Pittsburgh, all of Pa.

[73] Assignee: Koppers Company, Inc., Pittsburgh, Pa.

[22] Filed: Jan. 26, 1973

[21] Appl. No.: 326,777

Related U.S. Application Data

[63] Continuation of Ser. No. 81,334, Oct. 16, 1970, abandoned.

[52] U.S. Cl. .............................................. 260/346.4
[51] Int. Cl. ............................................. C07c 63/18
[58] Field of Search .................................. 260/346.4

[56] References Cited
OTHER PUBLICATIONS

Czarnota et al., Przem. Chem., (1967), Vol. 46, (11), p. 663–665.
Geldart, Chemistry and Industry, Sept. 2, 1967, p. 1474–1481.
Riley, Trans. Instn. Chem. Engrs., (1959), Vol. 37, p. 305–312.

*Primary Examiner*—Henry R. Jiles
*Assistant Examiner*—Bernard Dentz
*Attorney, Agent, or Firm*—Oscar B. Brumback; Olin E. Williams

[57] ABSTRACT

In an improved process for the production of phthalic anhydride in which air and napthalene vapors are flowed upwardly through a reaction zone containing a fluidized oxidation catalyst, the improvement is effected by increasing the napthalene to catalyst contact ratio in a novel range, greatly in excess of the normal contact ratios that are now employed. The novel napthalene to catalyst contact ratio is achieved by using increased superatmospheric pressure much higher than those pressures normally used in such fluidized processes. The novel napthalene to catalyst contact ratio accomplished by the use of increased pressure permits fluidized oxidation to proceed at greatly increased napthalene feed rates and lower air to napthalene weight ratios than normally employed in such fluidized processes, while nevertheless maintaining moderate reaction temperatures, such as will produce a high yield of phthalic anhydride free to a novel extent of either insufficiently or over-oxidized products.

The explosion hazard that one would expect to encounter in such an improved process under such intensified conditions of high napthalene to catalyst contact is avoided by using lower air-napthalene ratios than those ratios which will support explosive conditions.

The aforesaid conditions encompass novel combinations of reaction temperature, pressure, reactant proportions and throughputs that effect a highly intensified catalysis; and that result in a several-multiple increase in unit plant capacity.

5 Claims, 2 Drawing Figures

INVENTORS
ROBERT C. RYDER, ROBERT E. RYAN &
WILLIAM J. KLAPPROTH, JR.

3,852,308

PROCESS FOR THE PRODUCTION OF PHTHALIC ANHYDRIDE

This is a continuation of application Ser. No. 81,334, filed Oct. 16, 1970, now abandoned.

BACKGROUND OF THE INVENTION

This invention is in the field of fluidized catalytic oxidation of naphthalene or ortho-xylene to phthalic anhydride. The oxidation of naphthalene to produce phthalic anhydride is carried out commercially by either a fixed or fluid catalyst bed system. Oxidation of ortho-xylene is also carried out in such systems, although fluidized oxidation of orthoxylene may require the use of special promoters as described in U.S. Pat. No. 3,407,215, or a special catalyst such as described in British Pat. No. 1,192,416. In this specification, the new process will be described in connection with naphthalene oxidation.

In the fluid catalyst bed system a mixture of naphthalene vapors and oxygen containing gas, usually air, flows upwardly at an elevated temperature through a reaction zone of vanadium pentoxide containing catalyst at a vertical velocity to maintain the catalyst in a fluidized condition to oxidize the naphthalene to phthalic anhydride. A significant commercial drawback of all systems for the production of phthalic anhydride lies in the relatively low naphthalene feed stock rates and the high air to naphthalene weight ratios that must be used. Most commercial reactors use naphthalene feed stock rates that are very low in relation to the amount of catalyst employed, and use air to naphthalene weight ratios that are greatly in excess of the stoichiometric ratio of 4.85:1. Generally naphthalene feed rates of about 0.04 to 0.06 pounds of naphthalene per hour per pound of catalyst, and air to naphthalene weight ratios of about 30 to 1 to 10 to 1 are used. See for example, "Combining Oxygen and Hydrocarbons for Profit" by M. Sittig, Gulf Publishing Co., Houston, Tex., page 173 (1962).

Low naphthalene feed rates and high air to naphthalene weight ratios have heretofore had to be used to obtain good yields of phthalic anhydride at reasonable reaction temperatures. Higher naphthalene feed rates and lower air to naphthalene weight ratios required the use of increasingly higher reaction temperatures to ensure good yields of phthalic anhydride. However, higher reaction temperatures are undesirable because they cause premature catalyst degradation as exhibited by substantial loss of catalyst activity and/or life. Furthermore, intensification of reaction conditions by the techniques heretofore attempted has tended to introduce explosion hazards that have up until now prevented use of such conditions.

Because of the above mentioned reasons there has up until now not been obtained an effective method of increasing naphthalene feed rates or decreasing air to naphthalene weight ratios, or, more importantly, of increasing the capacity of a given installation while at the same time obtaining high yields of pure phthalic anhydride at reaction temperatures which will not prematurely degrade catalyst. This invention provides such a method.

SUMMARY OF THE INVENTION

The improvement constituting this invention comprises conducting the fluidized catalytic oxidation of preferably naphthalene, but with appropriate catalyst selection ortho-xylene, at completely new high feedstock to catalyst contact ratios, which ratios are accomplished by employing novelly high reaction pressures. The increased contact of naphthalene to catalyst assures that high feed stock rates and low air to naphthalene weight ratios may be employed while attaining high yields of phthalic anhydride at moderate reaction temperatures. This moderate reaction temperature in turn provides a high purity of product, since the intensified conditions do not result in an increase in less oxidized products than phthalic anhydride, e.g. naphthoquinone; nor result in an increase in over oxidized products, e.g. maleic anhydride.

DETAILED DESCRIPTION

Figure 2:
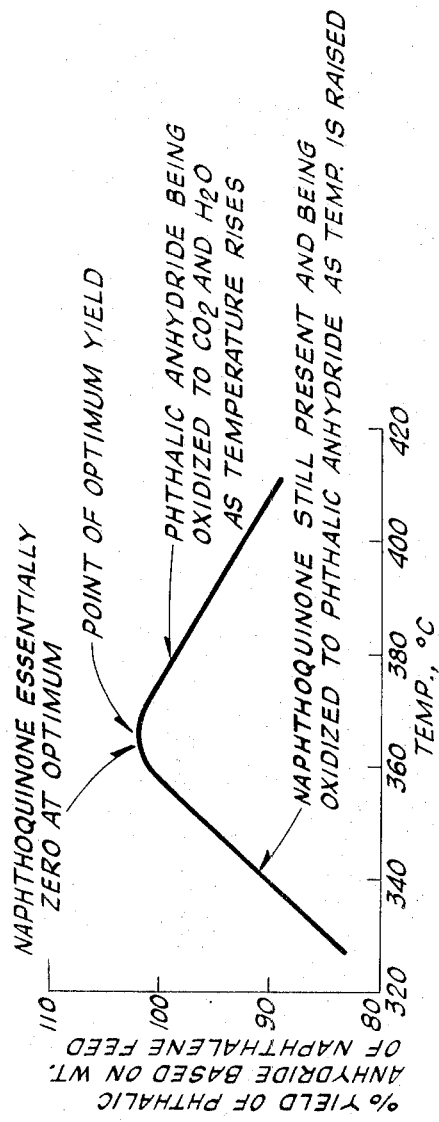
FIG. 2 is a process flow sheet depicting a plant for fluidized catalytic oxidation of naphthalene or ortho-xylene to phthalic anhydride.

The naphthalene to catalyst contact ratio in the fluidized catalytic oxidation of naphthalene to phthalic anhydride is the key controlling variable in oxidizing effectively naphthalene at high feed rates and low air to naphthalene ratios, and thus at high throughput capacity in equipment of given size, while maintaining, nevertheless, high yields of pure phthalic anhydride at moderate reaction temperatures. The naphthalene to catalyst contact ratio is a measure of the intensification of catalysis, and is a governing factor in the oxidizing load which may be imposed on the catalyst. Heavier oxidizing loads can be imposed upon the catalyst than was heretofore believed possible. The greater oxidizing loads imposed upon the catalyst greatly increase the throughput capacity of a particular reactor.

The naphthalene to catalyst contact ratio can be expressed as the weight of naphthalene that is present at any given moment in a given volume of reaction zone per weight of catalyst that is present at the same moment in said volume of reaction zone. This is true because standard commercial catalysts have relatively uniform surface to weight ratios and thus the weight of a given catalyst is a direct measure of its surface. Upon further inspection, the ratio can be simplified to the weight of naphthalene per weight of catalyst in a reactor at any given moment. The amount of naphthalene present at any moment in the reactor is an inverse function of the ratio of air to naphthalene in the feed gas and a direct function of the pressure in the reactor.

The weight of naphthalene in the reaction zone is calculated by dividing the naphthalene feed rate (pounds of naphthalene per second) by the velocity (feet per second) of the naphthalene vapors passing through the fluidized catalyst, and multiplying the result by the height of the fluidized catalyst bed (feet). Feed rate is a readily measurable variable. The velocity of the naphthalene vapors passing through the fluidized catalyst is of course the same as the velocity of the entire mixture of reactant gases passing through the fluidized catalyst.

For our purpose here, the gas velocity which will be employed is the superficial velocity, i.e., the velocity based on the open cross-section of the reactor, rather than the velocity in the catalyst voids. The two are related as follows:

Superficial Velocity = (Velocity in Voids) × (Void Fraction in Bed)

and, since the void fraction is a reasonably constant quantity under the conditions suitable for commercial fluidized bed operations, the naphthalene to catalyst contact ratio calculated using superficial velocity will in effect be a nearly constant percentage of the value which would be obtained if we had used the actual velocity in the catalyst voids.

A typical calculation of the naphthalene to catalyst contact ratio is as follows: a fluidized catalytic reactor for oxidizing naphthalene to phthalic anhydride contains 122,000 pounds of oxidation catalyst. Naphthalene is fed into this reactor at a rate of 11,000 pounds per hour. The superficial velocity of the naphthalene passing through the fluidized catalyst bed is 1.2 feet per second. The catalyst bed height is 35 feet.

Assuming for purposes of simplifying the calculation that none of the naphthalene has been oxidized, the naphthalene in the reactor at any given instant =

(11,000/3,600 lb. naphthalene/second) × (35/1.2 seconds) = 89.0 lb. of naphthalene Naphthalene to cataylst contact ratio = weight of naphthalene in reactor/weight of catalyst in reactor 89.0/122,000 = 7.29 × $10^{-4}$ (pounds of naphthalene/pound of catalyst)

The greatly increased, novelly high, naphthalene to catalyst contact ratio (a normal operation of a plant of the same size would employ a feed of about 5,000 pounds per hour at a naphthalene to catalyst contact ratio of about 3.3 × $10^{-4}$) is that which permits the fluidized oxidation to proceed at greatly increased naphthalene feed rates and lower air to naphthalene weight ratios which in turn produce novelly high throughputs and increased unit plant capacities. To achieve the benefits of this invention, the naphthalene to catalyst contact ratio should be at least 4.0 × $10^{-4}$ and preferably should exceed 4.5 × $10^{-4}$.

The average pressure in the fluidized catalyst bed to bring about the novelly high naphthalene to catalyst contact ratios mentioned above should be at least 25 pounds per square inch gauge, preferably within the range of 35 to 500 pounds per square inch gauge. At lower pressures, below the lower pressure limit, the catalysis is not sufficiently intensified to permit the high naphthalene feed rates and low air to naphthalene weight ratios as provided by this invention.

At higher pressures, that is above 500 pounds per square inch gauge, expensive air compressors and other related expensive high pressure equipment must be employed making commercial operations at these high pressures economically impracticable.

The naphthalene feed rate is usually expressed as pounds of naphthalene feed per hour. It can also be expressed as pounds of naphthalene feed per hour per pound of catalyst in the fluidized reaction zone. The naphthalene feed rate when expressed in this latter manner is referred to in the art as the naphthalene loading. Increasing the naphthalene to catalyst contact ratio in accordance with this invention permits the use of naphthalene loadings of about 0.080 to 0.500 pounds of naphthalene feed per hour per pound of catalyst.

Air to naphthalene weight ratio is a common way of expressing the amount of air used to oxidize naphthalene to phthalic anhydride.

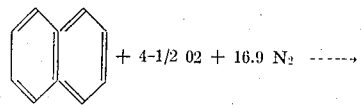

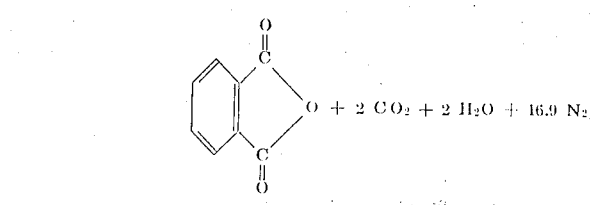

The above equation shows that the partial combustion of naphthalene calls for a theoretical oxygen consumption of 4.5 moles per mole of naphthalene. Because air is used as the oxidizing agent, 16.9 moles of inert nitrogen accompany the oxygen, and an equivalent of 21.4 volumes of air is thus theoretically required per volume of naphthalene vapor, (more commonly expressed as 4.85 pounds of air per pound of naphthalene).

Air to naphthalene weight ratios of between 10 : 1 and 30 : 1 have been generally used in the prior art, these being, of course, greatly in excess of the stoichiometric ratio of 4.85 : 1. The lower ranges of these currently employed ratios are actually within the explosive range for the fluidized reaction mixture. Explosions generally do not occur, however, because of the fluidized nature of the reaction. The fluidized particles dissipate heat very effectively and thus usually avoid temperature build-up ("hot spots") to explosive temperatures.

Increasing the naphthalene to catalyst contact ratio in accordance with this invention, permits the use of air to naphthalene weight ratios of about 6.0 : 1 to 8.5 : 1, much lower than heretofore used by the prior art. This air to naphthalene ratio range is outside explosive limits, and thus permits the use of higher pressures, and higher catalyst intensification without the danger of explosion that such intensified conditions of an exothermic reaction would otherwise certainly introduce. At air to naphthalene weight ratios below the lower limit, i.e., 6.0 : 1, excessively high reaction temperature must be employed to insure high yields of phthalic anhydride. These high reaction temperatures prematurely degrade the catalyst and should be avoided.

In the foregoing discussion, the operating region which is the subject of this invention is defined in terms of the weight ratio of air to naphthalene. As will be evident, the critical ratio is that of oxygen to naphthalene, and the invention can be practiced using other oxygen-containing gases, e.g., oxygen-enriched air, or recycled tail gas plus air, so long as the oxygen to naphthalene weight ratio falls within the 1.40 : 1 to 1.97 : 1 range is equivalent to the 6.0:1 to 8.5:1 weight ratio of air to naphthalene discussed above.

The reaction temperature of this invention is generally the temperature at which the novelly high concentrations of naphthalene in contact with catalyst are oxidized at the highest yield without production of more than an irreducible minimum amount of under oxidized or overoxidized products. This temperature is commonly referred to in the art as the optimum conversion temperature.

Figure 1:
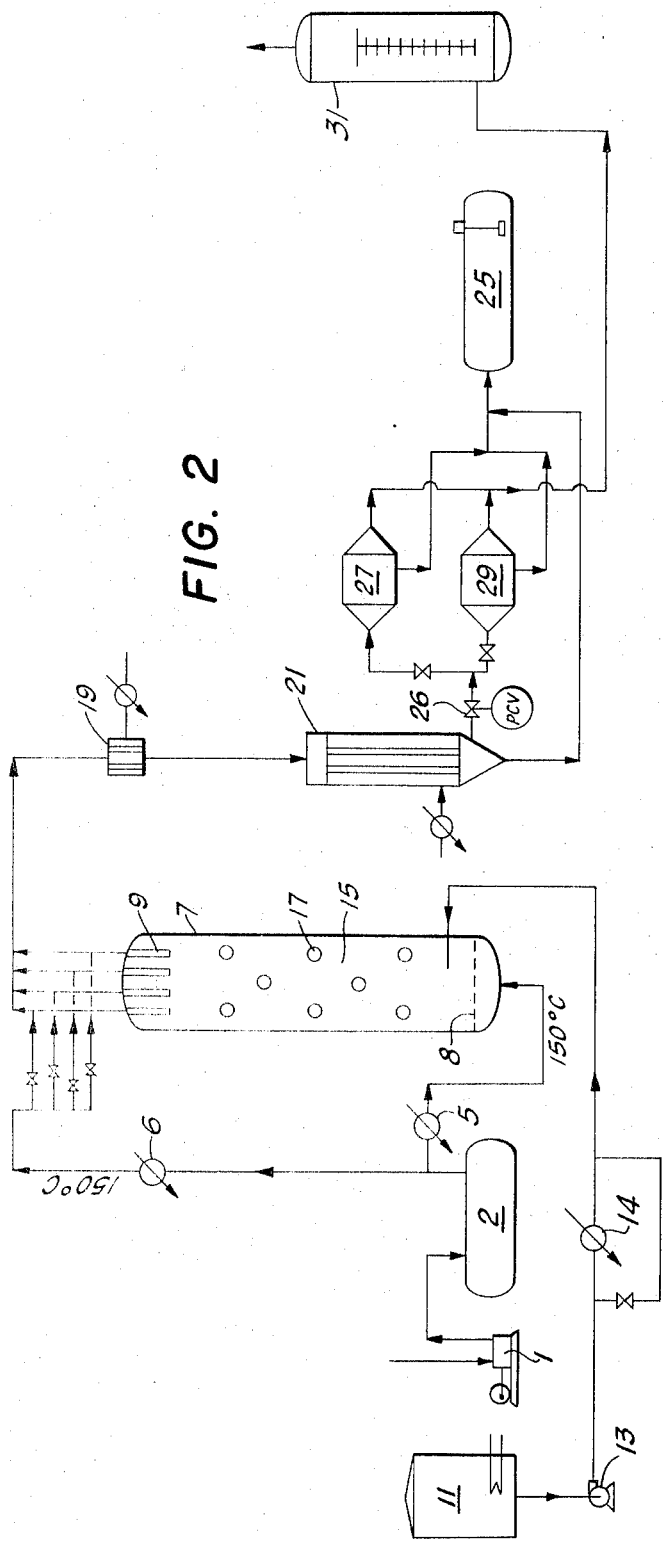
FIG. 1 is a graph of the weight yield of phthalic anhydride expressed as per cent of naphthalene feed versus reaction temperature at a fixed naphthalene to catalyst contact ratio.

A reaction temperature versus phthalic anhydride yield graph, FIG. 1, shows that at a given naphthalene-catalyst contact ratio a pronounced maximum yield is obtained at or within the very narrow range of temperatures (optimum conversion temperature). At lower temperatures, conversion of naphthalene is incomplete and the product gases will contain an increased amount of unconverted feed stock as well as intermediate oxidation products, such as naphthoquinone. At higher temperatures, there will be excessive formation of higher oxidation products, notably maleic anhydride, carbon dioxide, and water.

In a commercial reactor using a standard supported vanadium pentoxide containing catalyst, the selection of a reaction temperature providing maximum yield of phthalic anhydride at a given naphthalenecatalyst contact ratio is critical; and, within the operable range of contact ratios as heretofore mentioned, will vary between about 320° C and 380° C and rarely, if ever, above 400° C.

It should be noted that the reaction temperatures employed in this invention are temperatures which are normally associated with fluidized catalytic oxidations conducted at much lower naphthalene loadings and higher air to naphthalene weight ratios and than employed in this invention. This invention is able to use much higher naphthalene loadings and lower air to naphthalene weight ratios, thus greatly increasing the reactor capacity, and yet maintain moderate reaction temperatures.

It is important to observe that the increase in reactor capacity of this invention is obtained without sacrifice of yield of phthalic anhydride. In fact the usual commercial yields of something in excess of 90 to 95 pounds of phthalic anhydride per 100 pounds naphthalene feed are somewhat enhanced by the invention because the moderate and closely controlled critical temperature of our improved method reduce the production of by-products. Therefore by practicing the principles of this invention phthalic anhydride in yields of at least 90 pounds of phthalic anhydride per 100 pounds of naphthalene feed can easily be attained.

As aforementioned the combined flow of air and naphthalene upwardly through the reaction zone should be sufficient to maintain the catalytic phase in the form of a stable and dense fluidized mass of specific height. To accomplish this, the superficial velocities of the gaseous reactants upwardly through the reactor should be within the range of 0.4 to 5.0 feet per second and preferably around 0.5 to 2.0 feet per second.

In the following specific examples, the catalyst used is the so-called low temperature silica gel-based vanadium pentoxide catalyst. The standard low temperature catalyst is prepared by impregnating silica gel with a salt solution containing, for example, ammonium metavanadate and a potassium sulfate, drying, for example in a spray dryer, and activating the catalytic mass by calcination. The catalyst comprises about 3 to 10 percent by weight vanadium pentoxide and about 15 to 35 percent by weight of a potassium sulfate supported on about 55 to 75 percent by weight of a silica gel carrier. The catalyst in its freshly prepared state is characterized by a surface area of from about 150–350 square meters per gram and a pore volume of about 0.5 to 0.7 cubic centimeters per gram. Such a catalyst is described in Canadian Pat. No. 722,168.

For a clearer understanding of this invention FIG. 2 and the following specific examples of the invention are set forth below.

FIG. 2 is a process flow sheet for a commercial plant producing phthalic anhydride via the fluidized bed catalytic oxidation of naphthalene. Air is compressed in a compressor 1 and is sent to an air receiver 2. A main stream of air from the air receiver 2 is heated to about 150° C in air heater 5, and then enters the bottom of the fluidized catalytic reactor 7, passing through a distribution device 8 before entering into the dense fluidized catalyst bed 15. A minor stream of air passes from the air receiver 2 through an air heater 6 where it is heated to about 150° C. The minor stream of heated air is used to blow back into the reactor catalyst particles which accumulate in the air filters 9 located at the top of the reactor 7. Molten naphthalene is pumped from a storage tank 11 by metering pump 13 through vaporizer 14 where the naphthalene is vaporized before being injected into the fluidized catalytic bed 15. Alternatively, the molten naphthalene can be injected directly into the fluidized catalytic bed 15 above the air entrance where it immediately vaporizes since the fluidized catalytic bed 15 is maintained at about a temperature of 320°–400°C by means of temperature control elements 17. The mixture of gases passes through the fluidized catalyst bed 15, then through filters 9 to remove catalyst particles which are entrained in the ascending gases. The mixture of gases leaving the filters 9 next enters a gas cooler 19 where the gaseous product stream is cooled to a temperature just above the dew point with respect to phthalic anhydride. The cooled gas stream then passes into a partial condenser 21 where typically over half of the phthalic anhydride that is present in the gaseous stream is condensed as a liquid. The liquid phthalic anhydride is separated from the remaining gas stream and it flows to a liquid storage tank 25. The gas stream passes from the partial condenser 21 into one of two switch condensers 27 or 29 depending upon which is on a cooling cycle. Phthalic anhydride deposits as a solid in the switch condenser. The switch condenser 27 or 29 after it has condensed a predetermined amount of phthalic anhydride is shut off from the incoming gas stream and is switched to a heating cycle to melt the condensed phthalic anhydride. Simultaneously, the other switch condenser, which at this point has been re-cooled after completing the heating cycle, is opened to the gas stream to condense incoming phthalic anhydride. The phthalic anhydride which is melted in either switch condenser flows to the liquid weigh tank 25. The remaining gas stream that leaves the cooling switch condenser is sent to a gas scrubber 31 where it is washed with water before being vented to the atmosphere. A pressure control regulator 26 is located between the partial condenser 21 and the switch condensers 27 or 29, as illustrated, or alternatively it may follow the switch condensers. This pressure control valve imposes the back pressure on the fluidized catalytic reactor which is necessary in the practice of this invention. Also by controlling the pressure at this specific point in the plant process, the phthalic anhydride can be condensed in the partial condenser 21 as a liquid instead of a solid. This is so, because increasing the pressure raises the dew point of phthalic anhydride above the melting point, thus permitting condensation of the phthalic anhydride directly as a liquid.

EXAMPLE I

A reactor as generally illustrated as 7 in FIG. 2 of the drawings, having a diameter of 13 feet, is charged with 114,000 pounds of vanadium pentoxide containing catalyst supported on silica gel, as described in Canadian Pat. No. 722,168. Air is fed into the bottom of the reactor at 18,000 standard cubic feet per minute. Naphthalene liquid is metered into the fluidized catalytic bed at 10,500 pounds per hour (naphthalene loading = 0.093 pounds of naphthalene per hour per pound of catalyst) whereupon it immediately vaporizes. The air to naphthalene weight ratio in the fluidized bed is 7.8 : 1. The gaseous mixture of air, naphthalene and reaction products pass upwardly at a superficial velocity of about 1.45 feet per second, fluidizing the catalytic particles to form a dense fluid bed of about 41 feet in height. The average pressure in the fluidized bed is 38 pounds per square inch gauge. Under these conditions a naphthalene to catalyst contact ratio of $7.23 \times 10^{-4}$ pounds of naphthalene per pound of catalyst is obtained. The reaction temperature of the fluidized bed is maintained at 375° C which is the temperature which produces the maximum yield of phthalic anhydride, that is a reactor yield of 100 pounds of phthalic anhydride per 100 pounds of naphthalene feed.

EXAMPLE II

A reactor as illustrated generally in FIG. 2 of the drawings and as described in the preceding Example I is charged with 105,000 pounds of vanadium pentoxide containing catalyst supported on silica gel described in Example I. Air is fed into the bottom of the reactor at 21,300 standard cubic feet per minute. Naphthalene liquid is metered into the fluidized catalytic bed at 13,500 pounds per hour whereupon it immediately vaporizes (naphthalene loading = 0.13 pounds of naphthalene per hour per pound of catalyst). The air to naphthalene weight ratio in the fluidized bed is 7.15 : 1. The gaseous mixture of air, naphthalene and reaction products pass upwardly through the catalyst bed at a superficial velocity of about 1.7 feet per second fluidizing the catalytic particles to form a dense fluid bed of about 39½ feet in height. The average pressure in the fluidized bed is 39 pounds per square inch gauge. Under these conditions the naphthalene to catalyst contact ratio is $8.3 \times 10^{-4}$ pounds of naphthalene per pound of catalyst. The reaction temperature of the fluidized bed is maintained at 370° C which is the temperature which produces the maximum yield of phthalic anhydride that is, 99 pounds of phthalic anhydride produced per 100 pounds of naphthalene feed.

EXAMPLE III

A reactor of the type illustrated generally in FIG. 2 of the drawings but having dimensions of 18 feet in height and 1.939 inches in diameter is charged with about 7 pounds of vanadium pentoxide containing catalyst supported on silica gel as described in Canadian Pat. No. 722,168. Air is fed into the bottom of the reactor at 1.89 standard cubic feet per minute. Naphthalene vapor is metered into the fluidized catalyst bed at a rate of 1.34 pounds per hour (naphthalene loading = 0.19 pounds of naphthalene per hour per pound of catalyst). The air to naphthalene weight ratio in the fluidized bed is 6.5 : 1. The gaseous mixture of air, naphthalene and reaction vapors pass upwardly through the catalyst bed at a superficial velocity of about 0.80 feet per second, fluidizing the particles to form a dense fluid bed 12.5 feet in height. The back pressure imposed upon the fluidized bed is 50 pounds per square inch gauge. Under these conditions the naphthalene to catalyst contact ratio is $8.25 \times 10^{-4}$ pounds of naphthalene per pound of catalyst. The reaction temperature of the fluidized bed is maintained at 370° C which is the temperature which produces the maximum yield of phthalic anhydride that is, 102 pounds of phthalic anhydride per 100 pounds of naphthalene feed.

EXAMPLE IV

A reactor as illustrated generally in FIG. 2 of the drawings, and described in the preceding Example III is charged with about 7 pounds of vanadium pentoxide containing catalyst supported on silica gel as generally described in Example III. Air is fed into the bottom of the reactor at 2.03 standard cubic feet per minute. Naphthalene vapor is metered into the fluidized catalytic bed at 1.55 pounds per hour (naphthalene loading = 0.22 pounds of naphthalene per hour per pound of catalyst). The air to naphthalene weight ratio in the fluidized bed is 6.0 : 1. The gaseous mixture of air, naphthalene and reaction products pass upwardly at a superficial velocity of about 0.49 feet per second, fluidizing the catalyst particles to form a dense fluid bed of about 12.5 feet in height. The average pressure in the fluidized bed is 102 pounds per square inch gauge. Under these conditions the naphthalene to catalyst contact ratio is $15.7 \times 10^{-4}$ pounds of naphthalene per pound of catalyst. The reaction temperature of the fluidized bed is maintained at 372° C which is the temperature which produces the maximum yield of phthalic anhydride, that is, 98 pounds of phthalic anhydride per 100 pounds of naphthalene feed.

EXAMPLE V

A reactor of the type illustrated generally in FIG. 2 of the drawings but having dimensions of 18 feet in height and 1.939 inches in diameter is charged with about 7 pounds of vanadium pentoxide containing catalyst supported on silica gel as described in Canadian Pat. No. 722,168. Air is fed into the bottom of the reactor at 1.23 standard cubic feet per minute. Naphthalene vapor is metered into the fluidized catalyst bed at a rate of 0.665 pounds per hour (naphthalene loading = 0.089 pounds of naphthalene per hour per pound of catalyst). The air to naphthalene weight ratio in the fluidized bed is 8.45 : 1. The gaseous mixture of air, naphthalene and reaction vapors pass upwardly through the catalyst bed at a superficial velocity of about 0.63 feet per second, fluidizing the particles to form a dense fluid bed 12.5 feet in height. The back pressure imposed upon the fluidized bed is 25 pounds per square inch gauge. Under these conditions the naphthalene to catalyst ratio is $4.90 \times 10^{-4}$ pounds of naphthalene per pound of catalyst. The reaction temperature of the fluidized bed is maintained at 342° C which is the temperature which produces the maximum yield of phthalic anhydride that is, 106 pounds of phthalic anhydride per 100 pounds of naphthalene feed.

What is claimed is:

1. In a process for the production of phthalic anhydride by the oxidation of naphthalene in vapor form wherein a mixture of air and naphthalene vapors flows upwardly at an elevated temperature through a dense fluid bed of oxidation catalyst at a vertical velocity to maintain the catalyst in a fluidized condition, said catalyst being comprised of about 3 to 10 percent by weight of vanadium pentoxide and about 15 to 35 percent by weight of potassium sulfate supported on about 55 to 75 percent by weight of silica gel, the improvement comprising:

a. maintaining the reaction zone at a superatmosphere pressure of at least 25 pounds per square inch gauge;
b. maintaining the air to naphthalene weight ratio within the range of 6.0 : 1 to 8.5 : 1;
c. maintaining the naphthalene loading within the range of 0.08 to 0.50 pounds of naphthalene per hour per pound of fluidized catalyst; and
d. maintaining the reaction temperature within the range of from 320° to 400° C.

whereby a naphthalene to catalyst contact ratio of at least $4.0 \times 10^{-4}$ pounds of naphthalene per pound of catalyst is maintained.

2. In a process for the production of phthalic anhydride by the oxidation of naphthalene in vapor form wherein a mixture of air and naphthalene vapors flows upwardly at an elevated temperature through a reaction zone of catalyst at a vertical velocity to maintain the catalyst in a fluidized condition, said catalyst being comprised of about 3 to 10 percent by weight of vanadium pentoxide and about 15 to 35 percent by weight of potassium sulfate supported on about 55 to 75 percent by weight of silica gel, the improvement comprising:

a. maintaining the reaction zone at a superatmospheric pressure of at least 25 pounds per square inch gauge so as to maintain a naphthalene to catalyst contact ratio, as in part a result of said superatmospheric pressure, of at least $4.0 \times 10^{-4}$ pounds of naphthalene per pound of catalyst;
b. maintaining an air to naphthalene weight ratio within the range of 6.0 : 1 to 8.5 : 1;
c. maintaining the naphthalene loading within the range of 0.08 to 0.50 pounds of naphthalene per hour per pound of fluidized catalyst; and
d. maintaining at reaction temperature within the range of 320° to 400° C;

whereby a yield of phthalic anhydride of at least 90 pounds per 100 pounds of naphthalene feed is obtained.

3. In a process for the production for the production of phthalic anhydride by the oxidation of naphthalene in vapor form wherein a mixture of air and naphthalene vapors flows upwardly at elevated temperature through a reaction zone of catalyst at a vertical velocity to maintain the catalyst in a fluidized condition, said catalyst being comprised of about 3 to 10 percent by weight of vanadium pentoxide and about 15 to 35 percent by weight of potassium sulfate supported on about 55 to 75 percent by weight of silica gel, the improvement comprising:

a. maintaining the reaction zone at superatmospheric pressure of between 35 and 500 pounds per square inch gauge;
b. maintaining the air to naphthalene weight ratio within the range of 6.0 : 1 to 8.5 : 1;
c. maintaining the naphthalene loading within the range of 0.08 to 0.50 pounds of naphthalene per hour per pound of fluidized catalyst; and
d. maintaining the reaction temperature within the range of 320° to 400° C;

whereby a yield of phthalic anhydride of at least 90 pounds per 100 pounds of naphthalene feed is obtained.

4. In a process for the production of phthalic anhydride by the oxidation of naphthalene in vapor form wherein a mixture of oxygen containing gases and naphthalene vapors flows upwardly at an elevated temperature through a reaction zone of catalyst at a vertical velocity to maintain the catalyst in a a fluidized condition, said catalyst comprising about 3 to 10 percent by weight of vanadium pentoxide and about 15 to 35 percent by weight of potassium sulfate supported on about 55 to 75 percent by weight of silica gel, the improvement comprising:

a. maintaining the reaction zone at a superatmospheric pressure of at least 25 pounds per square inch gauge, so as to maintain a naphthalene to catalyst contact ratio, as in part a result of said superatmospheric pressure, of at least $4.0 \times 10^{-4}$ pounds of naphthalene per pound of catalyst;
b. maintaining an oxygen to naphthalene weight ratio within the range of 1.4 : 1 to 1.97 : 1;
c. maintaining the naphthalene loading within the range of 0.08 to 0.50 pounds of naphthalene per hour per pound of fluidized catalyst; and
d. maintaining a reaction temperature within the range of 320° to 400° C;

whereby the yield of phthalic anhydride of at least 90 pounds per 100 pounds of naphthalene feed is obtained.

5. A process for the production of phthalic anhydride by the oxidation of naphthalene which comprises:

a. flowing an oxygen containing gas and vapors of naphthalene upwardly though a reaction zone of catalyst at a vertical velocity to maintain the catalyst in a fluidized condition, said catalyst comprising about 3 to 10 percent by weight of vanadium pentoxide and about 15 to 35 percent by weight of potassium sulfate supported on about 55 to 75 percent by weight of silica gel;
b. applying superatmospheric pressure of at least 25 pounds per square inch gauge so as to maintain, as in part a result of said superatmospheric pressure, a naphthalene to catalyst contact ratio of at least $4.0 \times 10^{-4}$ pounds of naphthalene per pound of catalyst;
c. feeding naphthalene to the reaction zone at a rate within the range of 0.08 to 0.50 pounds of naphthalene per hour per pound of fluidized catalyst and at a rate to maintain an oxygen to naphthalene weight ratio within the range of 1.4 to 1.97 : 1;
d. reacting at a temperature of from 320° to 400° C; and
e. recovering at least 90 pounds of phthalic anhydride per pound of naphthalene feed.

* * * * *